United States Patent
He

(10) Patent No.: US 9,154,777 B2
(45) Date of Patent: Oct. 6, 2015

(54) TESTING SYSTEM FOR ANTI-ELECTROMAGNETIC INTERFERENCE

(71) Applicant: ShenZhen Treasure City Technology Co., LTD., Shenzhen (CN)

(72) Inventor: Xiao-Lian He, Shenzhen (CN)

(73) Assignee: ShenZhen Treasure City Technology Co., LTD., ShenZhen (CN)

(*) Notice: Subject to any disclaimer, the term of this patent is extended or adjusted under 35 U.S.C. 154(b) by 350 days.

(21) Appl. No.: 13/858,097

(22) Filed: Apr. 8, 2013

(65) Prior Publication Data
US 2013/0286222 A1    Oct. 31, 2013

(30) Foreign Application Priority Data
Apr. 26, 2012 (CN) .......................... 2012 1 0125615

(51) Int. Cl.
H04N 7/18 (2006.01)
H04N 17/04 (2006.01)

(52) U.S. Cl.
CPC .................................... H04N 17/04 (2013.01)

(58) Field of Classification Search
USPC .......... 348/189, 180, 197, 169, 164, 126, 87, 348/80, 69, 50, 49, 231.3, 231.4, 240.2, 348/333.01, 359, 462, 474, 480, 507, 512, 348/515, 522, 725, 726, 739, 804; 361/133, 361/139, 140, 169.1, 172, 173, 175, 190, 361/254, 265, 827; 381/26, 58, 85, 91, 111, 381/116, 122, 332, 355, 375; 324/627
See application file for complete search history.

(56) References Cited

U.S. PATENT DOCUMENTS

| | | | | |
|---|---|---|---|---|
| 4,973,911 A * | 11/1990 | Marshall | ........................ | 324/628 |
| 5,068,616 A * | 11/1991 | Broyde et al. | ................ | 324/627 |
| 5,877,630 A * | 3/1999 | Kraz | ............................... | 324/511 |
| 2005/0276027 A1* | 12/2005 | Shen et al. | ..................... | 361/753 |
| 2010/0315290 A1* | 12/2010 | Grabbe | ......................... | 342/386 |
| 2011/0084711 A1* | 4/2011 | Chang et al. | .................. | 324/684 |

FOREIGN PATENT DOCUMENTS

| | | |
|---|---|---|
| TW | 200515023 A | 1/2005 |
| TW | 101819235 A | 9/2010 |
| TW | 201144829 A | 12/2011 |
| TW | 201204017 A | 1/2012 |

* cited by examiner

*Primary Examiner* — Jefferey Harold
*Assistant Examiner* — Mustafizur Rahman
(74) *Attorney, Agent, or Firm* — Novak Druce Connolly Bove + Quigg LLP

(57) ABSTRACT

A testing system includes a signal emitter, a signal collection apparatus, and an analyzer. The signal emitter emits electromagnetic signals to cause electromagnetic interference in an electronic device. The signal collection apparatus collects the signals outputted by the target electronic device and includes a light emitter and an optical fiber. The analyzer is electronically connected to the signal collection apparatus. The light emitter emits light beams which reproduce the signals collected by the signal collection apparatus, and optical fiber transmits the light beams to the analyzer, the analyzer receives the light beams and reconstitutes the original electrical signals, and analyzes determines the electronic device performance while being subjected to the electromagnetic interference.

14 Claims, 3 Drawing Sheets

TESTING SYSTEM FOR ANTI-ELECTROMAGNETIC INTERFERENCE

BACKGROUND

1. Technical Field

The disclosure generally relates to testing systems, and particularly to a system for testing anti-electromagnetic interference abilities.

2. Description of the Related Art

Electronic devices (e.g., televisions) are subjected to tests of immunity against ambient electromagnetic interference. During the tests, a signal emitter (e.g., an antenna) is placed adjacent to the electronic device to emit electromagnetic signals for interfering with the electronic device, and a signal collection apparatus collects video signals from the electronic device. Then, the signal collection apparatus transmits the video signals to an analyzer via a coaxial cable, and the analyzer determines the characteristics of the electronic device in rejecting electromagnetic interference, according to the video signals.

However, the signal collection apparatus cannot collect audio signals from the electronic device, which may cause a gap in the results or an imprecise testing result. Additionally, the electromagnetic signals may interfere with video signals because of the use of the coaxial cable.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

Figure 1:
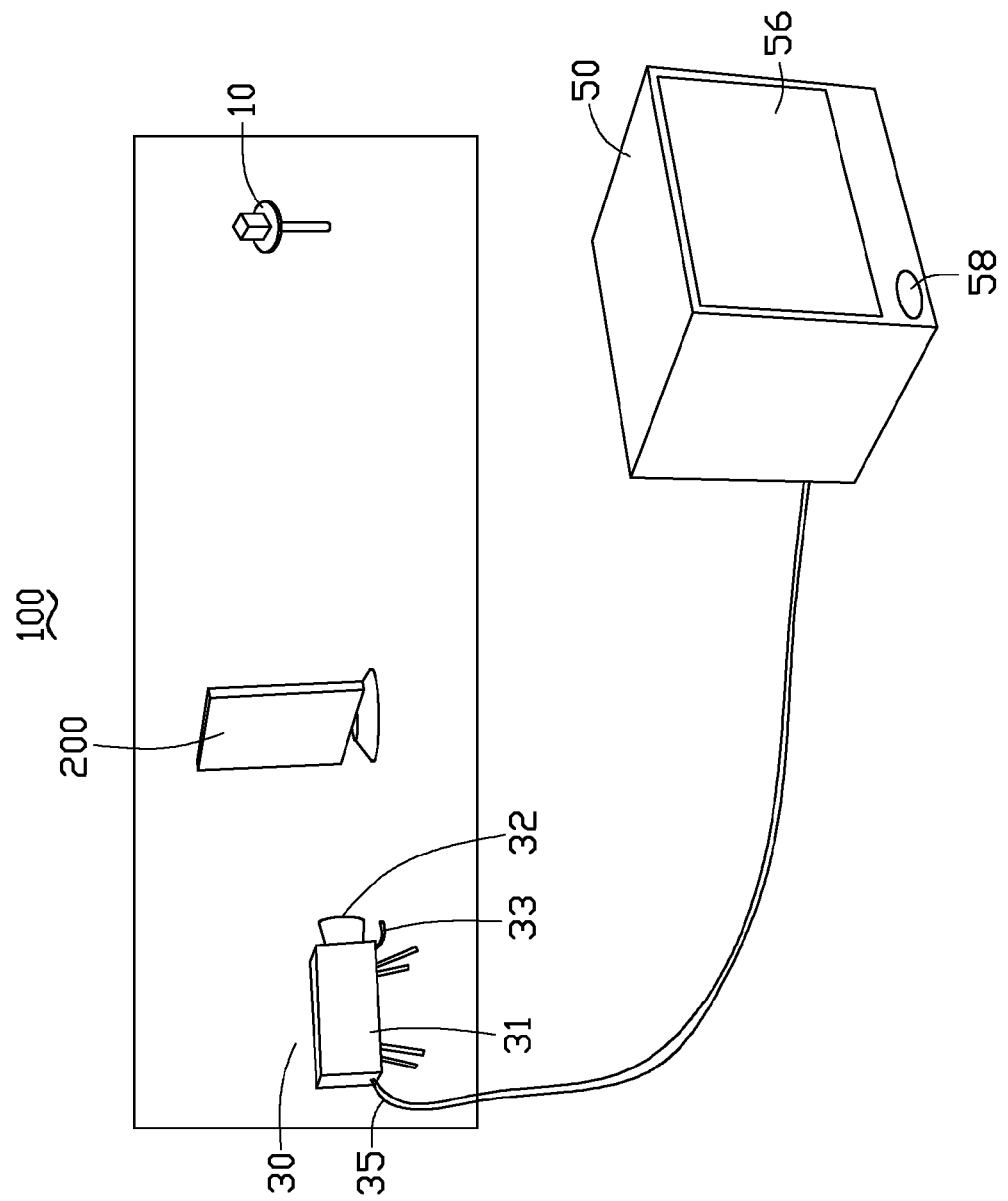
FIG. 1 is a schematic view of a system for testing anti-electromagnetic interference properties, according to an exemplary embodiment of the disclose.

FIG. 1 shows a testing system 100, according to an exemplary embodiment. The testing system 100 can be used to test audio and video qualities of an electronic device 200 and its degree of immunity against electromagnetic interference. The electronic device 200 may be, for example, a television.

The testing system 100 includes a signal emitter 10, a signal collection apparatus 30, and an analyzer 50. The signal emitter 10, the signal collection apparatus 30, and the electronic device 200 are all placed in a shielding room (not labeled) to isolate them against extraneous interference.

In one exemplary embodiment, the signal emitter 10 is an antenna which can emit electromagnetic signals of about 80 MHz-1 GHz, to cause electromagnetic interference in the electronic device 200. The electromagnetic signals can interfere with video signals and audio signals output from the electronic device 200. For example, when the electronic device 200 suffers from interference caused by the electromagnetic signals, the audio and video qualities of the electronic device 200 may be changed, manifested as faintness or dithering of the video signals, or interruption or attenuation of the audio signals.

Figure 2:
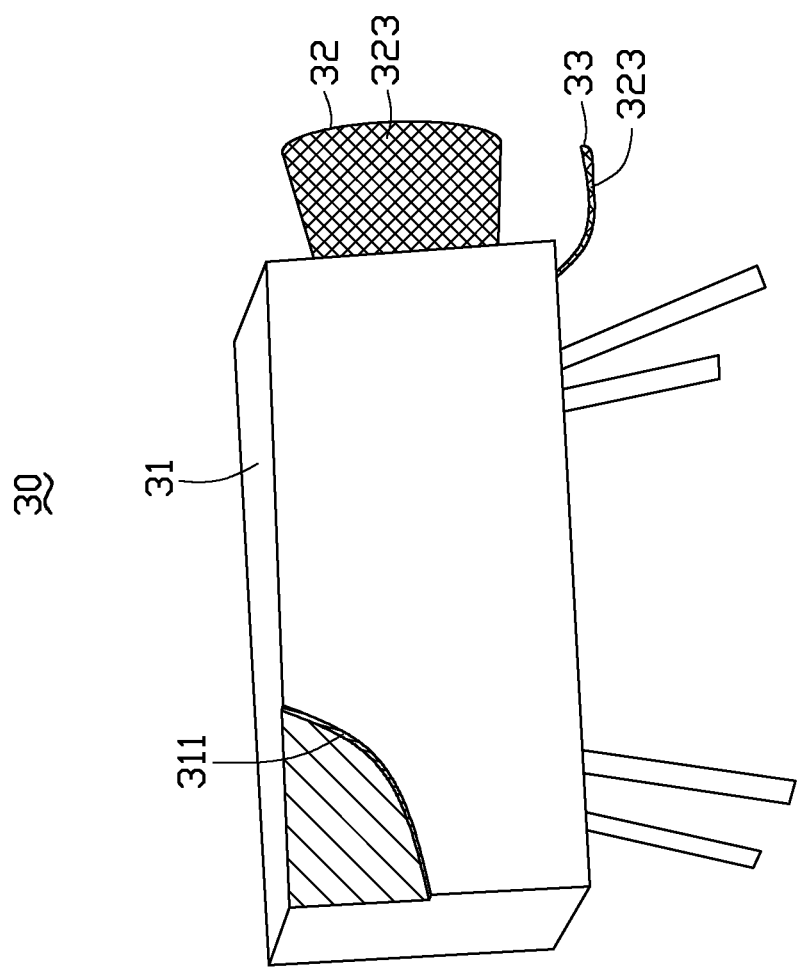
FIG. 2 is an enlarged view of a signal collection apparatus of the testing system of FIG. 1.
Figure 3:
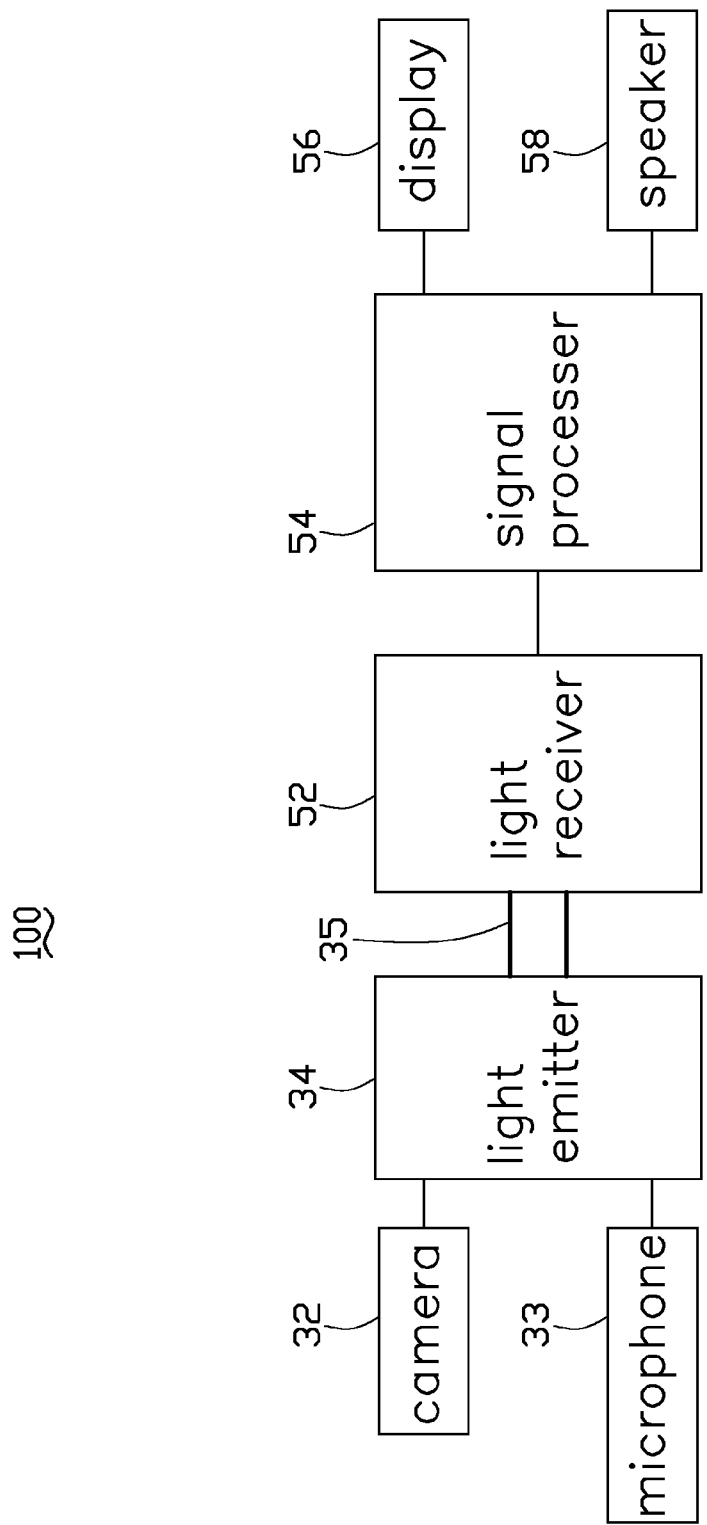
FIG. 3 is a block diagram of the testing system of FIG. 1.

FIG. 2 shows an enlarged view of the signal collection apparatus 30, and FIG. 3 shows a block diagram of the testing system 100. Referring to FIG. 2 and FIG. 3, the signal collection apparatus 30 collects the video and audio signals output from the electronic device 200 after interference by the electromagnetic signals has been applied. The signal collection apparatus 30 includes a housing 31, a camera 32, a microphone 33, a light emitter 34, and optical fiber 35. The housing 31 is made of metal, a cavity is therein. An absorption layer 311 is painted on the external surface of the housing 31, to absorb the electromagnetic signals transmitted to the housing 31, and to avoid any reflection of the signals by the housing 31. The absorption layer 311 can be made of, for example, ferric oxide(s). The camera 32 and the microphone 33 are fixed to one end of the housing 31, and have the electronic device 200 as their target. The camera 32 and the microphone 33 collect the video and audio signals respectively. In the present embodiment, in order to avoid electromagnetic interference with the camera 32 and the microphone 33, the external surfaces of the camera 32 and the microphone 33 are covered by one or more metal nets 323. Grid size of the metal net 323 is less than ¼ of the wavelength of the electromagnetic signals which cause interference.

The light emitter 34 is received in and shielded by the housing 31 to avoid interference by the electromagnetic signals. The light emitter 34 is electronically connected to the camera 32 and the microphone 33. The light emitter 34 receives the collected video and audio signals and emits two corresponding light beams. Respective strengths of the two light beams are changeable according to changes in the video and audio signal, for example, voltage changes in the video signal and frequency changes in the audio signal. The optical fiber 35 is electronically connected between the light emitter 34 and the analyzer 50. The two light beams are transmitted along the optical fiber 35 after total reflection. The optical fiber 35 transmits the collected signals to the analyzer 50, which has a higher degree of immunity against electromagnetic interference than the traditional cable used to transmit electronic signal, so the analyzer 50 is not affected by the interference to the collected video and audio signal.

The analyzer 50 includes a light receiver 52 and a signal processor 54. The light receiver 52 is electronically connected to the optical fiber 35, and receives the two light beams and transforms them into electronic signals. The signal processor 54 is electronically connected to the light receiver 52, and demodulates the electronic signals outputted by the light receiver 52, to reconstitute the video and audio signals. The signal processor 54 also calculates any distortion of the reconstituted video and audio signals. For example, the signal processor 54 compares the reconstituted video signal and a predetermined standard video signal, to calculate the distortion in the reconstituted video signal. The analyzer 50 further includes a display 56 and a speaker 58 which are electronically connected to the signal processor 54. The display 56 displays the video signal and the speaker 58 plays the audio signal, for monitoring by the operator who is located outside the shielding room, for example.

The operation steps of testing system 100 are as follows: first of all, the operator starts the electronic device 200 to output video and audio signals. Secondly, the signal emitter 10 starts to work and emits electromagnetic signals with predetermined frequencies, the electromagnetic signals may adversely affect the video and audio signal outputted by the electronic device 200. The camera 32 and the microphone 33 of the signal collection apparatus 30 collects the affected video and audio signals respectively, and transmits all the signals to the light emitter 34, then triggers the light emitter 34 emits a light beam accordingly, the two light beams are transmitted to the analyzer 50 through the optical fiber 35. Finally, the light receiver 52 receives the two light beams and converts the signals into electronic signals, the signal processor 54 demodulates the electronic signals to reconstitute the original video and audio signals. The operator can monitor the video and audio signals according to the display 56 and the speaker 58, and calculate any distortion of the video and audio signal affected by the signal emitter 10 according to the signal processor 54, thus the operator can determine the degree of immunity which the electronic device 200 may have against electromagnetic interference. For example, if the electronic device 200 is subjected to electromagnetic signals with certain predetermined frequencies, but the distortion of the video and audio signals remains within a predetermined range, the degree of immunity against electromagnetic interference of the electronic device 200 is determined to be good.

In summary, the testing system 100 collects audio signals according to the microphone 33 set by the collection apparatus 30, which is convenient for monitoring by the operator. Meanwhile, the testing system 100 transmits collected signals via optical fiber 35, and the original signals being captured and transmitted in the form of light rays renders them immune to electromagnetic interference. The housing 31 of the collection apparatus 30 absorbs electromagnetic interference directed to the housing 31, and shields the light emitter 34, so as to improve the precision and integrity of the process of collecting signals.

Although numerous characteristics and advantages of the exemplary embodiments have been set forth in the foregoing description, together with details of the structures and functions of the exemplary embodiments, the disclosure is illustrative only, and changes may be made in detail, especially in the matters of arrangement of parts within the principles of disclosure to the full extent indicated by the broad general meaning of the terms in which the appended claims are expressed.

What is claimed is:

1. A testing system for anti-electromagnetic interference, the testing system comprising:
   a signal emitter emitting electromagnetic signals causing electromagnetic interference in an electronic device;
   a signal collection apparatus collecting signals outputted by the target electronic device, the signal collection apparatus including a light emitter and an optical fiber, the light emitter emitting light beams which reproduce the signals collected by the signal collection apparatus; and
   an analyzer, wherein the optical fiber is electronically connected between light emitter and the analyzer and transmits the light beams to the analyzer, the analyzer receives the light beams and reconstitutes original signals, and analyzes and determines performance of the electronic device while being subjected to the electromagnetic interference.

2. The testing system as claimed in claim 1, wherein the signal collection apparatus further comprises a microphone collecting audio signal outputted by the interfered electronic device, the light emitter emitting a light beam according to the audio signal.

3. The testing system as claimed in claim 2, wherein the signal collection apparatus further comprises a camera collecting video signal outputted by the interfered electronic device, the light emitter emitting a light beam according to the video signal.

4. The testing system as claimed in claim 3, wherein the analyzer further comprises a light receiver electronically connected to the optical fiber, the light receiver receiving the light beams transmitted by the optical fiber and converting the light beams into electronic signals.

5. The testing system as claimed in claim 4, wherein the analyzer further comprises a signal processor electronically connected to the light receiver, the signal processor demodulating the electronic signal.

6. The testing system as claimed in claim 5, wherein the analyzer further comprises a display and a speaker electronically connected to the signal processor, the display displaying the video signal and the speaker plays the audio signal.

7. The testing system as claimed in claim 4, wherein the signal collection apparatus further comprises a housing made of metal and formed a cavity, the light receiver is received in the housing.

8. The testing system as claimed in claim 7, wherein the external surface of the housing is covered by an absorption material.

9. A testing system, comprising:
   a signal emitter emitting electromagnetic signals to cause electromagnetic interference in an electronic device;
   a signal collection apparatus including a camera used for collecting a video signal outputted by the target electronic device, a microphone used for collecting an audio signal outputted by the target electronic device, a light emitter emitting light beams respectively reproducing the video and audio signals collected by the signal collection apparatus, and an optical fiber; and
   an analyzer, wherein the optical fiber is electronically connected between light emitter and the analyzer and transmits the light beams to the analyzer, the analyzer used for receiving the light beams and reconstituting original video and audio signals, and analyzing and determining the electronic device performance while being subjected to the electromagnetic interference.

10. The testing system as claimed in claim 9, wherein the analyzer further comprises a light receiver electronically connected to the optical fiber, the light receiver receiving the light beams transmitted by the optical fiber and transforming the light beams into electronic signal.

11. The testing system as claimed in claim 10, wherein the analyzer further comprises a signal processor electronically connected to the light receiver, the signal processor demodulating the electronic signal.

12. The testing system as claimed in claim 11, wherein the analyzer further comprises a display and a speaker electronically connected to the signal processor, the display displaying the video signal and the speaker plays the audio signal.

13. The testing system as claimed in claim 12, wherein the signal collection apparatus further comprises a housing made of metal and formed a cavity, the light receiver is received in the housing.

14. The testing system as claimed in claim 13, wherein the external surface of the housing is covered by an absorption material.

* * * * *